United States Patent [19]

Luker

[11] 4,338,066

[45] Jul. 6, 1982

[54] GREASE GUN

[76] Inventor: Graham J. Luker, 79 Inverness Ave., Penshurst, Sydney, N.S.W., Australia, 2222

[21] Appl. No.: 120,636

[22] Filed: Feb. 11, 1980

[30] Foreign Application Priority Data

Jan. 25, 1979 [AU] Australia ............................. PD7476

[51] Int. Cl.³ ............................................... F04B 3/00
[52] U.S. Cl. ................................ 417/259; 417/268; 417/440; 417/446; 417/554
[58] Field of Search .............. 417/440, 446, 259, 253, 417/268, 298, 443, 552–554, 555 R

[56] References Cited

U.S. PATENT DOCUMENTS

| 1,292,498 | 1/1919 | Malone | 417/443 X |
| 1,834,698 | 12/1931 | Gille et al. | 417/440 X |
| 2,629,328 | 2/1953 | Ladd | 417/259 X |
| 2,948,222 | 8/1960 | Pine | 417/440 X |
| 3,894,816 | 7/1975 | Davis et al. | 417/443 X |
| 4,159,105 | 6/1978 | Vander Laan et al. | 417/443 X |

FOREIGN PATENT DOCUMENTS

| 656340 | 2/1938 | Fed. Rep. of Germany | 417/446 |
| 56457 | 11/1945 | France | 417/443 |

*Primary Examiner*—William L. Freeh
*Assistant Examiner*—Edward Look
*Attorney, Agent, or Firm*—Mahoney & Schick

[57] ABSTRACT

A grease gun is fed from a constant supply under pressure. The gun has a hand-pumped lever for delivering shots of grease either at high pressure and low volume or low pressure and high volume depending on a changeover valve. Air bleeds from the gun through the nozzle by a single pump of the lever. The lever causes a pushrod to open a one way valve allowing grease to travel entirely through the gun to the nozzle.

In another version the pushrod is replaced by a cone valve. Both versions are for single handed operation.

8 Claims, 4 Drawing Figures

GREASE GUN

BACKGROUND OF THE INVENTION

1. Field of the Invention

This invention concerns grease guns and specifically, ejector heads for dispensing grease applied to the head under predetermined pressure from an external supply. Such supplies are commonly contained in drums from which they are pumped by hand through a flexible hose to the ejector head.

2. Statement of Prior Art

In our Australian Pat. No. 243,546 we have described an ejector head of this type which relied upon a bleed screw valve for complete filling during use. The valve was unscrewed to bleed the low pressure chamber. The high pressure chamber and a barrel extending therefrom were separated from the low pressure chamber and in consequence could not be bled through the valve.

Operation of the valve made the ejector a two handed tool. The valve was messy in that it deposited grease on the surface of the ejector head. Similarly, the changeover valve which switched the head from low volume and high pressure operation to low pressure and high volume operation employed a screw feed valve which meant the ejector head required both hands for operation.

This invention seeks to provide an ejector head for single handed operations in which bleeding is conveniently and reliably achieved.

SUMMARY OF THE INVENTION

This invention provides an ejector head for greasing apparatus which holds a grease supply under predetermined pressure, said ejector head comprising a pair of interconnecting cylinders of different diameters, plungers moveable in said cylinders, a system of control valves connecting said cylinders with each other and with a grease supply, a changeover valve operable to alternatively render one or both plungers operative or inoperative, actuating means common to both plungers to inject grease at a low pressure and large volume or at a high pressure and small volume depending upon the setting of the changeover valve, a barrel extending forwardly of the cylinders, a one way valve forming part of said system located between the barrel and the cylinders and means extending forwardly of the plungers and lying between the foremost cylinder and said one way valve for causing grease to pass through said valve when the actuating means actuates said plunger.

Said means may be a cone valve actuated by axial displacement of the plungers. When said one way valve is a ball, spring loaded against a seat, the means may be a push rod extending from said plungers which displaces said ball from its seat.

BRIEF DESCRIPTION OF THE DRAWINGS

Certain embodiments of the invention are now described by way of example with reference to the accompanying drawings in which.

DETAILED DESCRIPTION OF THE PREFERRED EMBODIMENT

Figure 1:
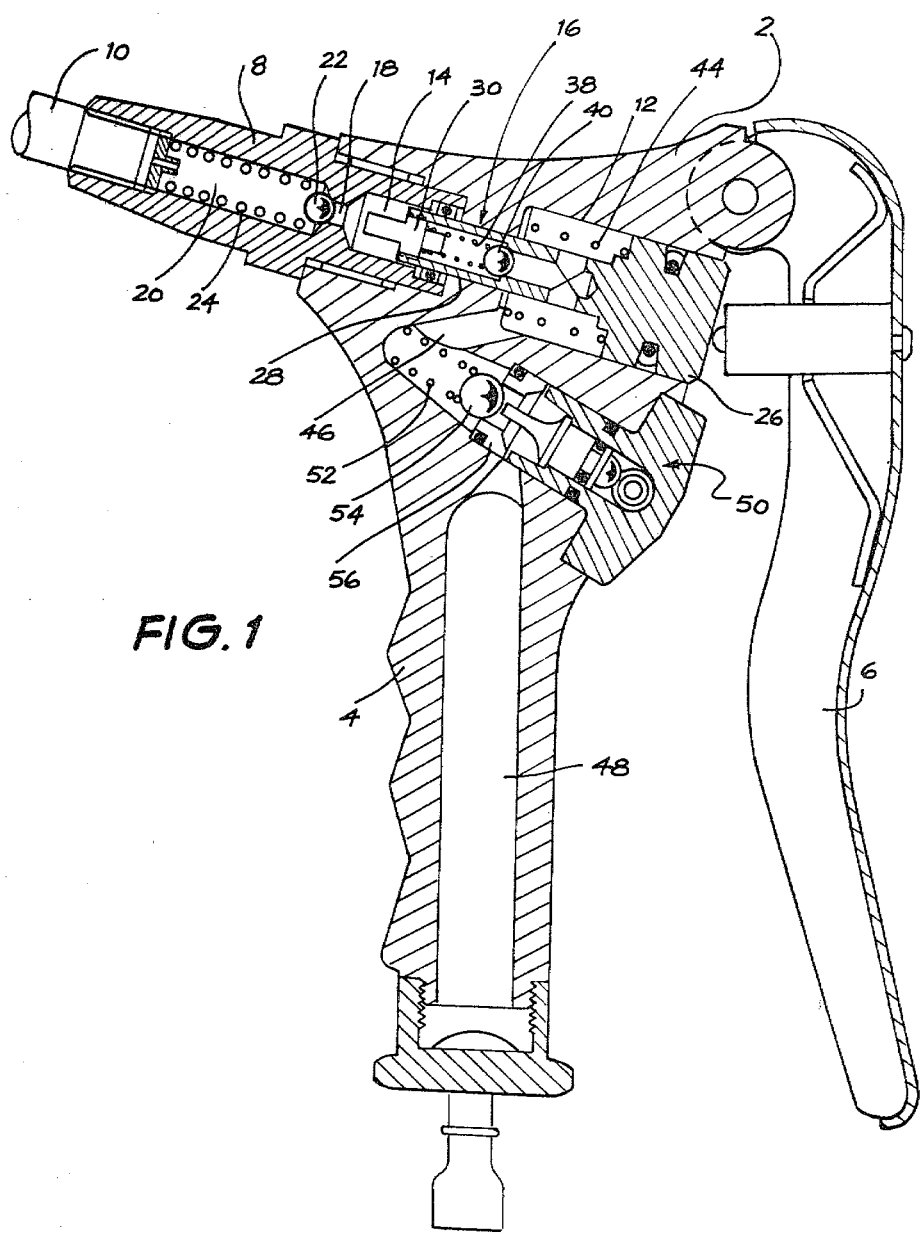
FIG. 1 is a sectional side elevation of the main portion of the ejector head.

The ejector head consists of a stock 2 with a handgrip 4 and a handle 6 which adapted to be held by one hand so that the handle 6 can be prompted. The stock 2 has a delivery barrel 8 at the front end. There is a conventional delivery tube 10 in the barrel and a conventional nozzle, (not shown) on the end of tube 10. A low pressure cylinder 12 is formed in and at the rear of the stock 2 and the high pressure cylinder 14 is formed in the barrel 8 in front of the low pressure cylinder 12 and the cylinders are axially aligned. The stock 2 and the barrel 8 are axially bored to provide a bore 16 extending between the cylinders 12, 14. Cylinder 14, communicates through axial port 18 with a valve chamber 20 formed in the barrel 8. The port 18 is normally closed by a ball valve 22 which is held on a valve seat by spring 24 which is of sufficient strength to hold the valve closed against the predetermined pressure of the grease supply. The cylinders are served by a low pressure plunger 26 and a smaller high pressure plunger 28. These form an integral assembly which moves in unison.

Figure 2:
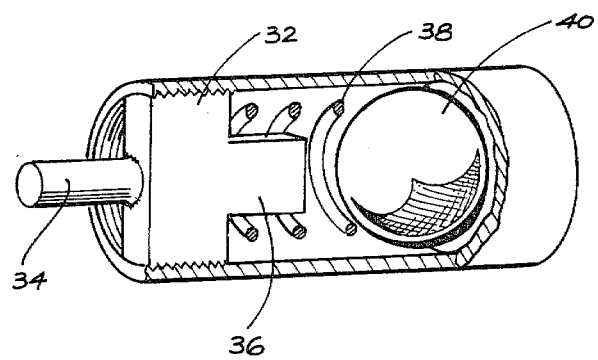
FIG. 2 is a perspective sectional view of the valve through which the low pressure cylinder communicates with the high pressure cylinder.

The forward end of the high pressure plunger carries a threaded cap 30 best seen in FIG. 2. The cap has a central web 32 with spaces on both sides, a push rod 34 and a rearward guide 36 for a spring 38 (see FIG. 1) which presses a ball 40 against a seat in the passage 42 joining the cylinders 12 and 14. The plunger 26 is urged rearwardly by spring 44 into contact with the handle 6.

Figure 4:
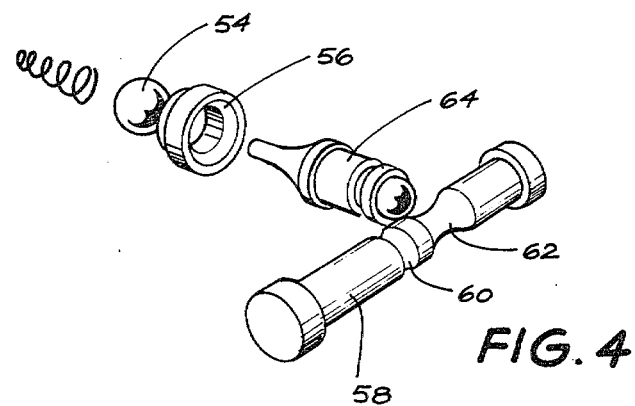
FIG. 4 is an exploded view of the main parts of the changeover valve.

The cylinder 12 is fed by passage 46 which communicates with a larger passage 48 in the handgrip 4 via a changeover valve 50. The valve 50 consists of a spring 52 which presses a ball 54 against a seat 56. A slide 58 (See FIG. 4) has two circumferential grooves 60, 62 which grooves engage a lifter 64 for lifting the ball 54 from its seat.

Figure 3:
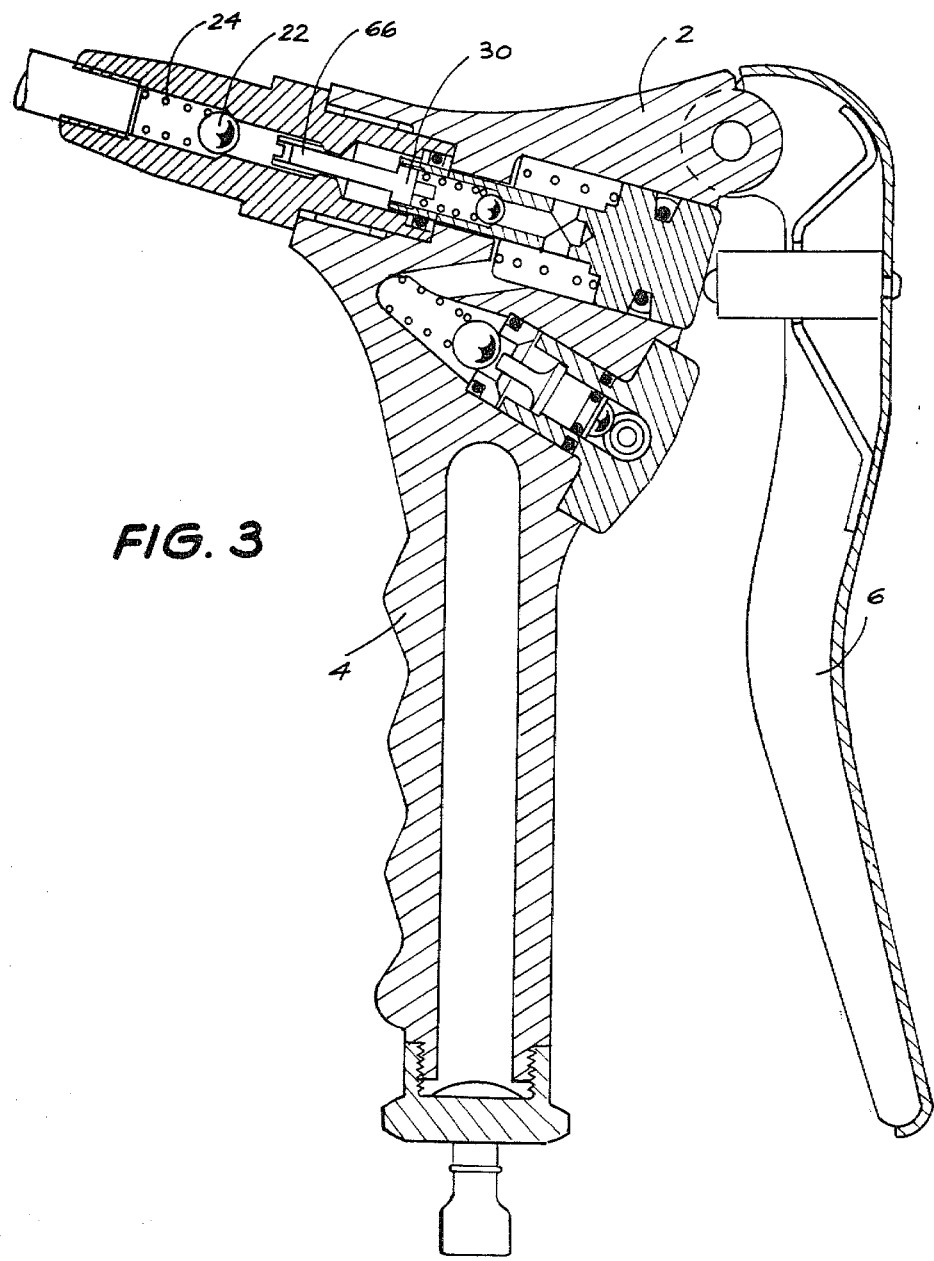
FIG. 3 is a sectional elevation of the main portion of an alternative form of the ejector head.

In the embodiment shown in FIG. 3, the construction is identical except that the cap 30 extends to form a conventional cone valve 66, the faces of which separate when the cap 30 is advanced by the lever 6.

The embodiment of FIG. 1 works as follows:

Grease is pumped from the supply at 150 psi. to the supply ejector head. The grease drives occluded air in front of it. The slide 58 is moved such that groove 60 engages lifter 65 thereby opening the changeover valve 50. The lever 6 of the head is then pressed which drives the plungers forward. The push rod 34 unseats the ball 22 and the grease advances through passage 46, low pressure cylinder 12, past valve 38, through the spaces on both sides of the cap web 32, into the high pressure cylinder 14, past ball 22 into the chamber 20 and out of tube 10. Upon release of the lever 6, the ball 22 closes and spring 24 is strong enough to prevent further ingress of grease. Thus the head is filled and bled in one operation. Likewise in the embodiment of FIG. 3, operation of the lever opens the cone valve releasing grease toward the ball 22 which opens because the pressure of spring 24 is weaker than the filling pressure. This valve therefore only serves as a check valve and is not required to be closeable under the influence of its spring loading against the grease supply. In contrast the same spring in FIG. 1 closes against the grease supply.

During low pressure operation, the changeover valve is held closed by the influence of its spring 52. The grease supply pressure is sufficient to cause this valve to open against the influence of its spring loading while the high and low pressure cylinders are being re-charged with grease to the point where the respective pressures therein are equalized with the grease supply pressure. When the lever 6 is actuated as aforesaid to cause axial movement of the high and low pressure plungers, the initial buildup of pressure in the low pressure cylinder 12 establishes a back pressure along the supply line which exceeds the supply pressure and causes the changeover valve to close under the influence of both the back pressure and the changeover valve spring loading. Grease stored in the low pressure cylinder 12 will therefore be forced by the low pressure plunger 28 to pass into the high pressure cylinder 14 by way of the aforementioned passage and associated ball and spring valve assembly 38, 40. The grease will then pass, still under pressure from the low pressure plunger 28 through the ball valve (which opens with the initial movement of the plungers) and along the tube 10 of the head. The ball and spring valve 38,40 situated within the passage communicating between the high and low pressure cylinders is normally held closed under the influence of its spring loading but opens when the low pressure cylinder is compressed and grease is formed, because of this compression, into the passage communicating between the high and low pressure cylinders.

During high pressure operation a slide of the changeover valve is moved to cause the valve to remain open. When the lever 6 is actuated to send both the high and low pressure plungers in a longitudinal direction to compress the relative cylinders, the ball valve opens. Because the changeover valve is held open, the grease stored in the low pressure cylinder 12, will be forced by the low pressure plunger 26 to flow back along the supply line against the supply pressure. The grease in the high pressure cylinder, however, will be forced by the high pressure plunger 28 to pass through the open ball valve and into the tube 10 to be extruded from the latter at high pressure and low volume.

The operation of the embodiment of FIG. 3 is similar except that when the plungers advance during both the low and high pressure operations the cone valve opens and the pressure is sufficient to open check valve 22.

The advantage is of the above embodiments are as follows.

Initial filling and the bleeding are easily accomplished. Re-charging with grease proceeds as a lever is operated and bleeding during any stage of greasing is possible. The provision of a cone valve integral with the plungers deliminates the problem of having to overcome any initial opening pressure exhibited by an exit valve. The opening pressure of the aforementioned check valve situated beyond the cone valve in discharge sequence is very small and of little consequence. The use of a slide operated changeover valve in a position which can be operated by the users thumb renders the ejector head very convenient to use.

I claim:
1. An ejector head for greasing apparatus which holds a grease supply under predetermined pressure; said ejector head comprising;
   a pair of interconnecting cylinders of different diameters, plungers movable in said cylinders,
   a system of control valves connecting said cylinders with each other and with a grease supply,
   a changeover valve selectively operable to alternatively render only one or both plungers operative, actuating means common to both plungers to eject grease at a low pressure and large volume or at high pressure and small volume depending upon the setting of the changeover valve,
   a barrel extending forwardly of the cylinders, a one-way valve forming part of said system located between the barrel and the cylinders and means extending forwardly of the plungers and lying between the foremost cylinder and said one way valve for causing grease to pass through said valve when the actuating means actuates said plungers.

2. An ejector head as claimed in claim 1 wherein said means is a cone valve actuated by axial displacement of the plungers.

3. An ejector head as claimed in claim 1 wherein said one way valve is a ball, spring loaded against a seat and the means ia a push rod extending from said plungers which displaces the ball from its seat.

4. An ejector head as claimed in claim 1,
   wherein said cylinders consist of a low pressure cylinder in the rear end of the ejector head and a high pressure cylinder formed in said barrel mounted on the front end of said ejector head, said low pressure cylinder being of larger diameter than the high pressure cylinder and being axially aligned therewith and being in communication therewith through an axial opening formed in the ejector head.

5. An ejector head as claimed in claim 4 wherein the plunger in the low pressure cylinder is normally moved by a spring to the rear of said cylinder into engagement with the actuating means and has the high pressure plunger connected to the front end thereof, said high pressure plunger being hollow and being in communication with the low pressure cylinder through ports formed in the rear end of the high pressure plunger.

6. An ejector head as claimed in claim 1 wherein the plunger of the high pressure cylinder is slideable in the axial opening formed in the ejector head and has its work end slideable in said high pressure cylinder, said plunger having a valve chamber therein and having a spring urged valve with the valve chamber normally closing the said port herein communicating with said valve chamber, said valve forming one part of the system of control valves and said valve spring being of sufficient strength to withstand the predetermined pressure applied to the grease supply.

7. An ejector head as claimed in claim 1
   wherein said changeover valve is a ball valve located in a valve chamber formed in the ejector head between the cylinders and the grease supply, said valve chamber being in communication with said grease supply through a port which is normally closed by said valve and being in communication with the low pressure cylinder through a port leading therefrom to the front end of said cylinder, said valve being held in a closed position by a spring of a strength less than the predetermined pressure of the grease supply.

8. An ejector head as claimed in claim 7 wherein the actuator means is a pivoted lever, the changeover valve is operated by a push rod which protrudes from either face of the ejector head in the region of the lever in a direction transversely of the lever in order to be operated by the same hand, and said push rod has a cam surface for displacing a lifter to open the ball valve.

* * * * *